(12) United States Patent
Pal et al.

(10) Patent No.: US 8,185,624 B2
(45) Date of Patent: May 22, 2012

(54) EFFICIENT ON-DEMAND PROVISIONING OF SERVERS FOR SPECIFIC SOFTWARE SETS

(75) Inventors: Satinder Pal, Faridabad (IN); Ryan Lemos, Mumbai (IN)

(73) Assignee: Oracle International Corporation, Redwood Shores, CA (US)

( * ) Notice: Subject to any disclaimer, the term of this patent is extended or adjusted under 35 U.S.C. 154(b) by 318 days.

(21) Appl. No.: 12/399,993

(22) Filed: Mar. 9, 2009

(65) Prior Publication Data

US 2010/0228839 A1    Sep. 9, 2010

(51) Int. Cl.
*G06F 15/173* (2006.01)
*G06F 15/16* (2006.01)
*G06F 21/00* (2006.01)

(52) U.S. Cl. ........... 709/224; 709/226; 709/208; 705/51
(58) Field of Classification Search ............... 725/96
See application file for complete search history.

(56) References Cited

U.S. PATENT DOCUMENTS

| | | | |
|---|---|---|---|
| 6,412,079 B1 | 6/2002 | Edmonds et al. | |
| 6,691,165 B1 | 2/2004 | Bruck et al. | |
| 6,944,788 B2 | 9/2005 | Dinker et al. | |
| 7,281,045 B2 * | 10/2007 | Aggarwal et al. | 709/226 |
| 7,506,264 B2 * | 3/2009 | Polan | 715/757 |
| 7,546,610 B2 * | 6/2009 | Aridor et al. | 719/320 |
| 7,693,993 B2 * | 4/2010 | Sheets et al. | 709/226 |
| 2003/0126202 A1 | 7/2003 | Watt | |
| 2004/0054780 A1 | 3/2004 | Romero | |
| 2005/0033794 A1 * | 2/2005 | Aridor et al. | 709/200 |
| 2006/0047813 A1 * | 3/2006 | Aggarwal et al. | 709/226 |
| 2006/0168224 A1 | 7/2006 | Midgley | |
| 2006/0224544 A1 * | 10/2006 | Keith, Jr. | 706/60 |
| 2006/0248159 A1 * | 11/2006 | Polan | 709/208 |
| 2007/0094396 A1 * | 4/2007 | Takano et al. | 709/226 |
| 2007/0282652 A1 * | 12/2007 | Childress et al. | 705/8 |

(Continued)

FOREIGN PATENT DOCUMENTS

EP    1206738 B1    4/2004

OTHER PUBLICATIONS

"Vanhastel, S; et al.,", "Design of a Generic Platform for Efficient and Scalable Cluster Computing Based on Middleware Technology", "First IEEE/ACM International Symposium", "http://ieeexplore.ieee.org/iel5/7358/19961/00923174.pdf?arnumber=923174", Dated: 2001, pp. 40-47.

(Continued)

*Primary Examiner* — Peling Shaw
*Assistant Examiner* — Joiya Cloud
(74) *Attorney, Agent, or Firm* — Narendra Reddy Thappeta

(57) ABSTRACT

An administrator system provided according to an aspect of the present invention facilitates efficient provisioning of servers for specific software sets. In an embodiment containing clusters of servers requiring execution of corresponding set of software, an administrator system selects a server from a free server pool and installs on the selected server only those of the required set of softwares that are not already installed on the selected server. As a result, the selected server can quickly be added to a desired cluster. Such a feature is particularly useful in an environment where different application environments are provided in different cluster of systems and many servers are available in the form of free server pools for addition to the desired clusters.

18 Claims, 5 Drawing Sheets

U.S. PATENT DOCUMENTS

2007/0294309 A1* 12/2007 Shwartz et al. .............. 707/200
2010/0287543 A1* 11/2010 Wehkamp .................... 717/171

OTHER PUBLICATIONS

"Jareva Technologies", "http://www.sparcproductdirectory.com/2002-05-2.html", Dated: May 2002, pp. 1-5.

"Antonio Abbondanzio; et al,", "Management of Application Complexes in Multitier Clustered Systems", "IBM Systems Journal", "http://www.research.ibm.com/journal/sj/421/forum.pdf", Dated: 2003, pp. 189-195, vol. 42, No. 1.

"Terraspring Enables Intelligent IT Infrastructure", "Terraspring Inc", "http://www.taborcommunications.com/dsstar/01/1113/103696.html", Downloaded Circa: Nov. 11, 2008, pp. 1-2.

"Dr. Joseph Reger", "The Architecture for Flexible Enterprise IT Dynamic Data Center", "Fujitsu Siemens Computers", "http://www.ddcchallenge.co.uk/pdf/DDC_Brochure.pdf", Copyright Date: 2007, pp. 1-54.

"ThinkControl", "Think Dynamics INc", "ftp://161.114.23.171/pub/solutions/thinkcontrol_flyer.pdf", Copyright Date: 2002, pp. 1-2.

* cited by examiner

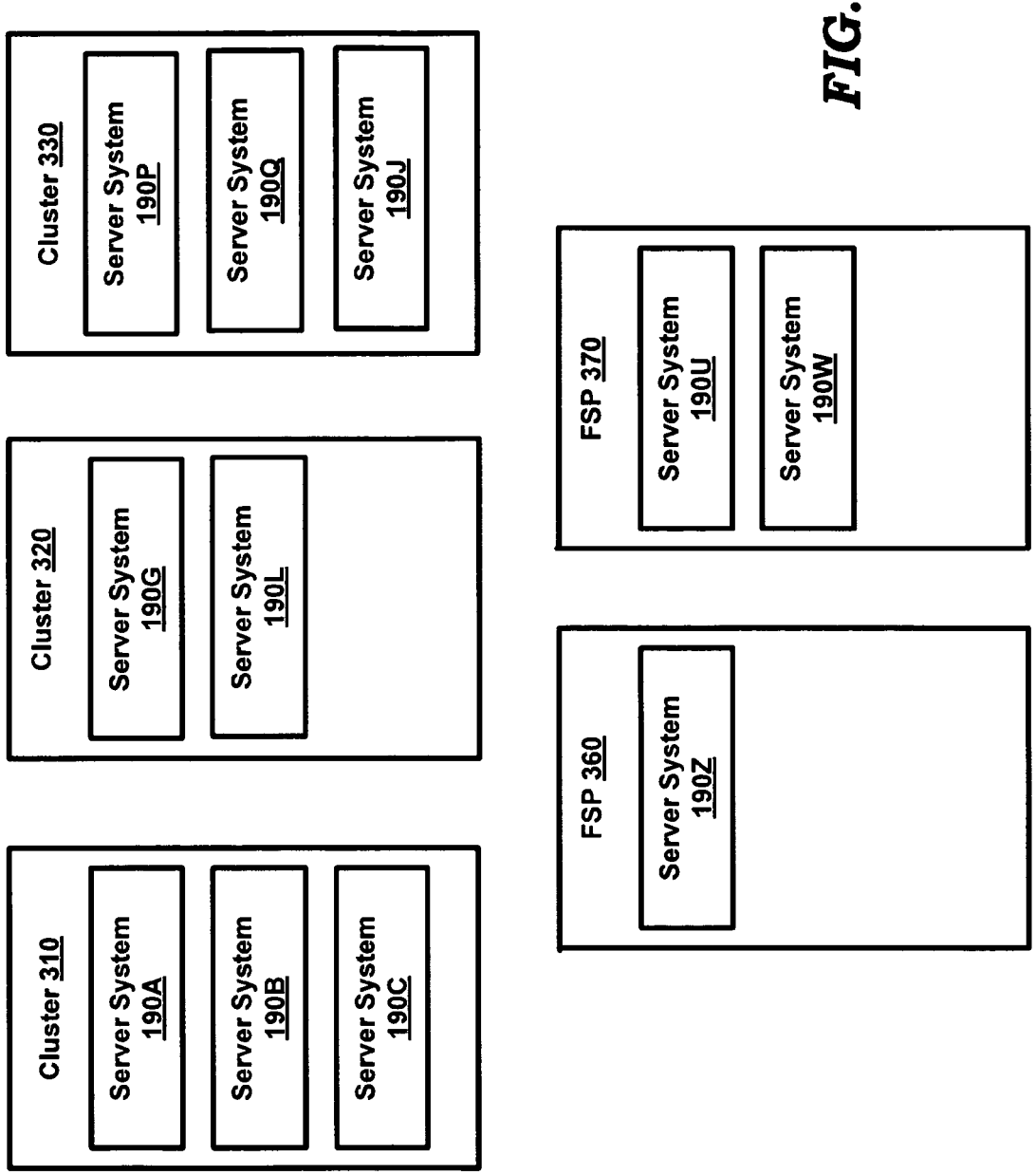

FIG. 4A

| FSPName | FSPServers | FSPSoftwareSet |
|---|---|---|
| FSP1 | 190Z | S1 |
| FSP2 | 190U, 190W | S1, S4, S5 |
| FSP3 | 190Y | S2, S3 |
| FSP4 | - | S1, S2, S3 |
| FSP5 | 190V, 190X | - |

FIG. 4B

| ClusterName | Cluster Servers | ClusterSoftwareSet |
|---|---|---|
| C1 | 190A, 190B, 190C | S1, S2, S3 |
| C2 | 190G, 190L | S1, S3, S4, S5 |
| C3 | 190P, 190Q, 190J | S1, S4, S5, S6 |
| C4 | 190M, 190N | S1, S2 |

EFFICIENT ON-DEMAND PROVISIONING OF SERVERS FOR SPECIFIC SOFTWARE SETS

BACKGROUND

1. Technical Field

The present disclosure relates to enterprise server technologies and more specifically to efficient on demand provisioning of servers for specific software sets.

2. Related Art

Provisioning of a server generally entails installation of a pre-defined specific software set, containing one or more softwares in the server (assuming that the server has a required hardware configuration). The installation steps are often performed by an administrator either manually or using appropriately designed installation software. Once provisioned, the server is ready to process requests received from client systems for an application environment constituted by executing the installed software set.

On-demand provisioning refers to a requirement for provisioning of a server within a short duration, typically from the time the requirement is identified. On-demand provisioning is often required in server cluster environments, where each cluster contains one or more servers servicing client requests. On determination of performance degradation, for example, when the service time for a user request exceeds a pre-defined threshold, it may be necessary that a new server be provisioned (with the same software set required for the cluster) and added to the cluster in a short duration to enable the same/more user requests to be serviced with acceptable performance.

In a prior approach, provisioning is performed assuming that a server is not pre-installed with any of the softwares in a desired software set. Such an assumption necessitates installation of all the softwares in the desired software set (including installing of any softwares that were present previously), thereby increasing the time required to provision the server. The approach may accordingly fail to meet the short duration requirements of on-demand provisioning.

According to another prior approach, groups of servers are pre-installed with corresponding desired software sets and kept ready for provisioning, thereby enabling on-demand provisioning requests to be processed within a short duration. A drawback with such an approach is that an on-demand provisioning request for a specific software set may not be processed due to non-availability of servers in the group corresponding to the specific software set, even though there may be servers available in other groups (pre-installed with other software sets).

It may be desirable that on-demand provisioning of servers for specific software sets be made more efficient.

BRIEF DESCRIPTION OF THE DRAWINGS

Example embodiments of the present invention will be described with reference to the accompanying drawings briefly described below.

FIG. 3 is a block diagram illustrating the logical view of grouping of server systems in an embodiment of the present invention.

FIG. 4A represents a table containing a portion of setup data in one embodiment.

FIG. 4B represents another table containing portion of cluster data in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An administrator system provided according to an aspect of the present invention facilitates efficient provisioning of servers for specific software sets. In an embodiment containing clusters of servers requiring execution of corresponding set of software and free server pools having respective software sets pre-installed, an administrator system selects a server from a free server pool and installs on the selected server only those of the required set of softwares that are not already pre-installed on the selected server. As a result, the selected server can quickly be added to a desired cluster.

Such a feature is particularly useful in an environment (e.g., grid computing) where different application environments are provided in different cluster of systems and many servers are available in the form of free server pools for addition to the desired clusters.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
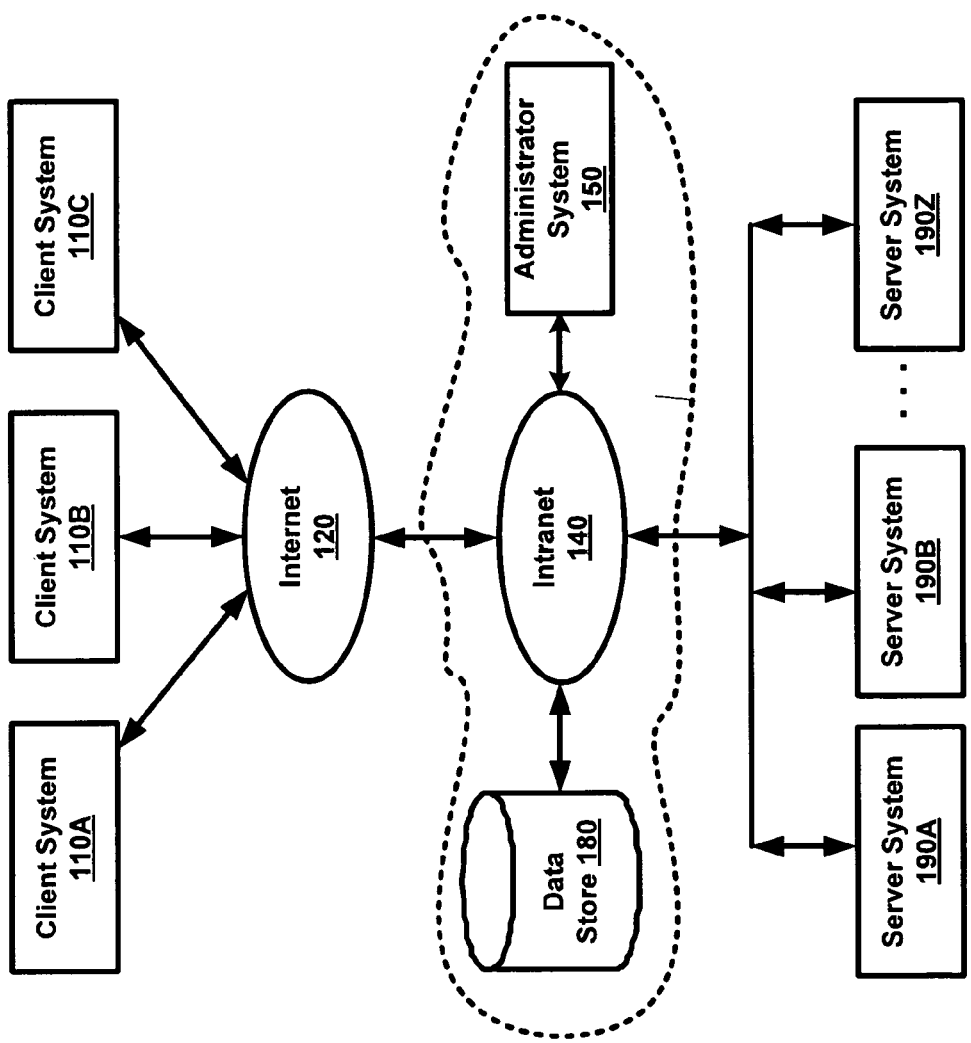
FIG. 1 is a block diagram illustrating the details of an example enterprise computing system environment in which several aspects of the present invention can be implemented.

FIG. 1 is a block diagram illustrating an example environment (computing system) in which several aspects of the present invention can be implemented. The block diagram is shown containing client systems 110A-110C, Internet 120, intranet 140, administrator system 150, database server 180, and server systems 190A-190Z.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190Z, database server 180 and admin system 150 (all shown within an enterprise, as indicated by the dotted boundary). Internet 120 extends the connectivity of these (in general, any of the systems within the enterprise) with client systems 110A-110C. Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Data store 180 represents a non-volatile storage facilitating storage and retrieval of a collection of data by one or more enterprise applications executing in server systems 190A-190Z (typically while processing various client requests). In one embodiment, data store 180 is implemented using relational database technologies and therefore provides storage and retrieval of data using structured queries such as SQL (Structured Query Language). SQL refers to a special-purpose, generally non-procedural language that supports the definition, manipulation, and control of data in systems implementing relational database technologies.

Each of client systems 110A-110C represents a system such as a personal computer, workstation, mobile station, etc., used by users to generate (client) requests to enterprise applications executing in server systems 190A-190Z. The requests may be generated using appropriate interfaces. In general, a client system requests an application for performing desired tasks and receives corresponding responses containing the results of processing of the requested tasks.

Each of server systems 190A-190Z represents a server, such as a web/application server, capable of executing appropriate software based on business requirements, the hardware configuration of the system etc. A software set may include one or more instances of software programs such as operating system, device drivers, virtual machine software (such as JVM available from Sun Microsystems), enterprise applications designed to process requests received from client systems 110A-110C (based on data maintained internally or on external data, for example, maintained in data store 180) etc. The software set may also include management software programs such as load balancer, fail-over manager etc., which co-ordinate/mediate the activities/execution of the multiple instances of the software programs, in particular, the enterprise applications.

Thus, it may be appreciated that only server systems 190A-190Z may be installed with corresponding software sets and provisioned to service client/user requests. The description is continued assuming that only server systems 190A-190T are currently provisioned (configured to serve user requests), with the other server systems 190U-190Z being available for on-demand provisioning (and accordingly are termed available servers).

During execution of the software sets installed in server systems 190A-190T, it may be determined, typically by a monitoring/management software, that the performance of a specific software set (and the enterprise applications in particular) executing on one or more server systems is degraded/reduced, for example, when the response/service time for processing a user/client request or the number of client request received exceeds pre-defined thresholds. Alternatively, based on future forecasts (e.g., during a specific time of a day, when more transaction requests are to be processed), it may be desirable to add new servers to a cluster. Thus, it may be required that a new server be provisioned for the specific software set within a short duration of time (to enable the current/future client requests to be serviced with acceptable performance).

Administrator system 150, provided according to several aspects of the present invention performs on-demand provisioning of servers for specific software sets as described below with examples.

3. On-Demand Provisioning of Servers

Figure 2:
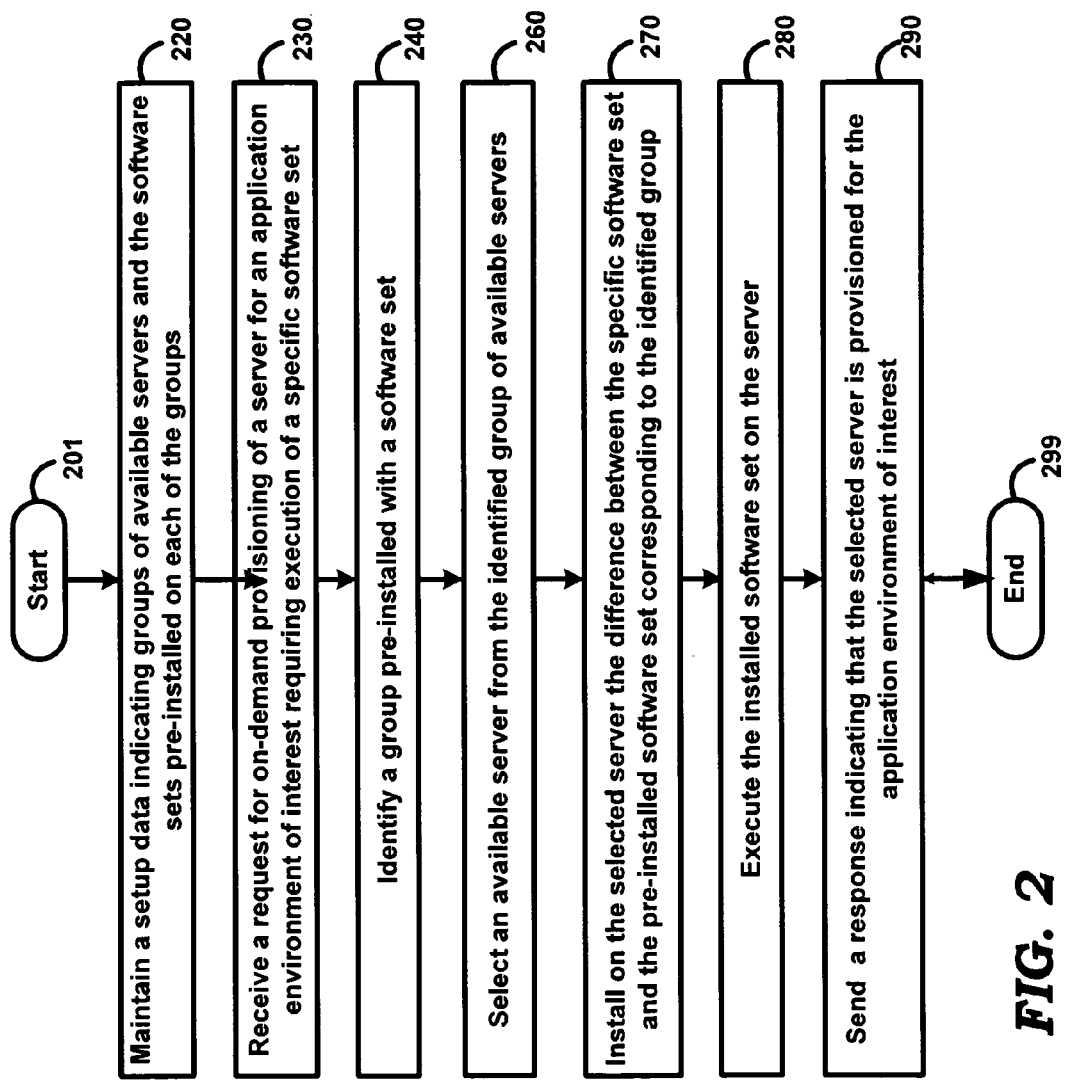
FIG. 2 is a flow chart illustrating the manner in which on-demand provisioning of servers for specific software sets is performed according to an aspect of the present invention.

FIG. 2 is a flowchart illustrating the manner in which on-demand provisioning of servers for specific software sets is performed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, administrator system 150 maintains a setup data indicating groups of available servers and the software sets pre-installed on the servers in each of the groups. An available server represents a server system (such as 190U-190Z) which can be used to fulfill/service the demands of applications requiring a specific software set of interest, though pre-installed with same or different softwares than those of the set of interest. A server is an "available server" when not in use or not configured/setup to serve any client requests. Servers pre-installed with the same software set are considered to belong to the same group.

The setup data may indicate the identifiers (name, IP addresses, etc.) of each server and the corresponding identifiers of the softwares pre-installed on the server. The identifiers of the servers and/or softwares (forming the setup data) may be provided by an administrator using appropriate interfaces. Administrator system 150 then stores the provided setup data internal to administrator system 150 (for example, in a secondary storage) or in data store 180.

It may be appreciated that any desired software sets may be chosen to be pre-installed in the available servers. In one approach, the software sets to be pre-installed are chosen by an administrator based on the software sets to be provisioned, the specific business requirements/environment, hardware configurations of the available servers, historical data related to the type/number of provisioning requests, etc. Thus, it should be appreciated that the setup data represents the present state of the softwares pre-installed on available servers.

In step 230, administrator system 150 receives a request for on-demand provisioning of a server for an application environment of interest requiring execution of a specific software set. The request may be received from a management software managing a group of server systems, each providing the same application environment (such as processing a specific type of user request). The management software may send such a request in response to occurrence of specific conditions such as detection of performance degradation by a monitoring software, when the number of user requests is expected to increase, etc. The request may contain the identifiers of the softwares included in the specific software set, the identifier of the specific software set, or merely identify the application environment of interest.

In step 240, administrator system 150 identifies a (server) group having an available server. Various approaches can be employed to efficiently identify the group. In one embodiment, the administrator may specify an order of groups corresponding to each software set of interest, and administrator system 150 checks each group in the specified order to identify a first group containing one available server.

Alternatively, administrator system 150 first determines the difference (in the number/type of softwares to be installed/un-installed) between the specific software set and each of the pre-installed software sets (corresponding to the groups) as indicated by the setup data. Administrator system 150 then checks the groups in the ascending order of the magnitude of the differences (that is, minimum difference to maximum difference) and identifies the first group containing an available server.

In step 260, administrator system 150 selects an available server from the identified group, in particular, when there is more than one available servers in the identified group. The selection may be performed based on one of several well known approaches, such as a random logic, usage history of the available servers in the group, hardware configuration (available resources on the servers), etc.

In step 270, administrator system 150 installs on the selected server the difference between the specific software set and the pre-installed software set corresponding to the identified group. The installation of the difference may entail, installation/un-installation of one or more softwares in the selected server. In general, administrator system 150 performs only the installations/un-installations/configurations necessary to upgrade the software set pre-installed on the selected server to match the specific software set.

It may be appreciated that errors may occur during installation of the differences, for example, due to hardware/software incompatibility issues, lack of resources, etc. In such a scenario, steps 240, 260 and 270 may be repeatedly performed until the difference is successfully installed on another server selected from the same or different group.

In step 280, the installed software is executed on the selected server to add the server to a group of servers providing the application environment. It should be appreciated that any necessary external actions (e.g., configuration of a load balancer front end) may also be performed to ensure that the added server is thereafter able to receive client requests and process them.

In step 290, administrator system 150 sends a response indicating that the selected server is provisioned for the application environment. Administrator system 150 may further update the setup data to indicate that the provisioned server is not available for further provisioning requests. The flowchart ends in step 299.

Thus, by installing only the differences (i.e., those softwares that are not already installed on a server being added to a cluster), on-demand requests for provisioning of a server for a specific software set can be efficiently processed.

Such a feature can be particularly advantageous in grid/cloud computing type environments in which, for example, several thousands of systems may be serving several hundreds of application environments (each environment requiring a corresponding software set) and the servers are dynamically being moved between the application environments. The manner in which the features of FIG. 2 can be deployed in such an environment is described below with an example.

4. Example Implementation

FIGS. 3 and 4A-4B together illustrate the manner in which on-demand provisioning of servers for specific software sets are performed in one embodiment. Each of the Figures is described in detail below.

FIG. 3 is a block diagram illustrating the manner in which server systems (190A-190Z) are logically grouped and provide respective application environments in one embodiment. The block diagram is shown containing clusters 310, 320 and 330, and free server pools (FSP) 360 and 370. Though not shown explicitly, the groups of servers may be connected to each other via and intranet 140 as shown in FIG. 1.

Further, only a few clusters/FSPs are shown in FIG. 3 to better illustrate the features of the present invention. However, as noted above, server systems 190A-190T that are currently provisioned for servicing user/client requests may form part of the same/different clusters and available server systems 190U-190Z may form part of the same/different free server pools described below.

Each of clusters 310, 320 and 330 represents a group of servers currently servicing client/user requests received from client systems 110A-110C. Each cluster of servers (or the corresponding application environment) may be designed to provide a corresponding set of functionalities and/or features, of the enterprise, for example, order processing, payroll, etc. Accordingly, each cluster (application environment) may require corresponding software set to be installed in each of the servers contained in the cluster.

For example, assuming that cluster 310 is required to provide the order processing feature/function ("application environment"), each of servers 190A, 190B, 190C forming cluster 310 requires installation of a order processing software set containing an operating system, device drivers to interface with input/output devices such as printers, an order processing application, etc. Similarly, servers 190D, 190E forming cluster 320 and server 190G, 190I, 190J forming cluster 330 may require installation of corresponding software sets. Alternatively, two clusters may be implementing the same application environment, but serving different groups of users, for example, of different organizations.

Each of FSP 360 and FSP 370 represents a group of available servers, which are pre-installed with corresponding software set (similar to or different from the software sets required for clusters 310, 320 and 330). Thus, server 190Z in FSP 360 is pre-installed with a first software set while each of available servers 190U and 190W in FSP 370 is pre-installed with a second software set.

Accordingly, when a server is to be added to one of the clusters, the request of step 230 is generated (by a management software/module, not shown), causing the operation of steps 240-290 of FIG. 2. However, as noted there, setup data is used in provisioning the server. The manner in which a setup data is maintained in one embodiment is described below with examples.

5. Setup Data

FIG. 4A depicts a portion of setup data in one embodiment. Table 400 specifies the details of the servers/softwares corresponding to FSPs (groups of available servers). Column 411 "FSPName" specifies a unique name corresponding to each free server pool.

Column 412 "FSPServers" specifies the identifiers of the available servers forming each free server pool. For convenience, the reference numbers of server systems used in FIGS. 1 and 3 are used as the identifiers, though any other identifier such as system name, IP address can be used in place of the reference numbers.

Column 413 "FSPSoftwareSet" specifies the set of softwares which is pre-installed in each of the servers in the free server pool. Only representative identifiers of the softwares (for example, "S1", "S2", etc) are specified in column 413, with the identifiers representing softwares such as Linux operating system available from Red Hat Corporation, Real Application Cluster (RAC) and Cluster Ready Services (CRS) both available from Oracle Corporation, etc. In general, the identifiers "S1", "S2", etc. may identify any desired softwares (or portions of softwares) according to the requirements of the environment in which the features of the invention is sought to be implemented.

Each of rows 421-425 specifies the details of a corresponding free server pool. In particular, row 421 specifies that a free server pool named "FSP1" is formed from server system 190Z which is pre-installed with the software set containing the software "S1". Similarly, other rows 422-425 specify the corresponding details of other FSPs. It may be observed that free server pools FSP1 and FSP2 (rows 421 and 422) correspond to FSP 360 and FSP 370 of FIG. 3.

Further, it may be noted that the free server pool named FSP4 (in row 424) is indicated to have no available servers. Such information may be maintained to simplify addition of new available servers to the free server pool, for example, by enabling an administrator to indicate the name of the free server pool (FSP4) instead of the specific softwares (S1, S2, S3) to be pre-installed. Further, the software set corresponding to the free server pool FSP5 (in row 425) is specified to be empty indicating that the servers contained in FSP5 are not pre-installed with any software (typically termed "bare metal").

It may be appreciated that the setup data of table 400 may maintained by administrator system 150 in data store 180 or internally within administrator system 150. The setup data of table 400 may be provided by an administrator or may be generated/updated in response to administrator requests for adding servers to one or more free server pools.

In one embodiment, each free server pool is associated with a corresponding software module, which is executed when adding an available server to the corresponding free server pool. The software module corresponding to FSP3 may be implemented as follows (shown in the form of pseudo code):

```
preinstalled_set = [S2, S3];
checkprofile(server);
foreach(software in preinstalled_set) {
    if(! server.isInstalled(software)) {
        server.install(software);
    }
}
FSP.add(server);
```

The variable "preinstalled_set" indicates the set of softwares S2, S3 that need to be pre-installed corresponding to FSP3 (as indicated by row 423 in table 400), and the variable "server" contains the identifier of the available server sought to be added to FSP3. The "checkprofile" function checks whether the server has the hardware/software profile required for FSP3.

The "foreach" loop is executed for each of the softwares in the preinstalled_set, with the inner "if" condition ensuring that each software in the preinstalled_set is installed on the server only when the software is not already installed on the server sought to be added to FSP3. The "FSP.add" function adds the server pre-installed with the required software set to FSP3 and also may update the setup data, in particular, add the server identifier to column 412 of the corresponding row.

Thus, administrator system 150 maintains setup data indicates groups of available servers (FSPs) and the software sets pre-installed on each of the groups/FSPs. Administrator system 150 may then receive a request for provisioning of a server from one of clusters 310, 320 and 330. The request may indicate the specific software set required to be installed on the server to be provisioned.

In one embodiment, administrator system 150 also maintains information such as the servers/software sets required corresponding to each cluster (hereafter referred to as "cluster data") as described in detail below.

6. Cluster Data

FIG. 4B depicts a portion of cluster data in one embodiment. Table 450 specifies the details of the servers/softwares corresponding to clusters (groups of servers currently servicing user/client requests or servers that are already provisioned).

Column 461 "ClusterName" specifies a unique name corresponding to each cluster. Column 462 "ClusterServers" specifies the identifiers (reference numbers) of the provisioned servers forming each cluster. Column 463 "ClusterSoftwareSet" specifies the set of softwares (represented as identifiers) which is required to be installed in each of the servers forming the cluster.

Each of rows 471-474 specifies the details of a corresponding cluster. In particular, row 471 specifies that a cluster named "C1" is formed from server systems 190A, 190B and 190C, each of which is installed with the software set containing the softwares S1, S2, S3. Similarly, other rows 472-474 specify the corresponding details of other clusters. It may be observed that clusters C1, C2 and C3 (in rows 471-473) correspond to clusters 310, 320 and 330 of FIG. 3.

Thus, when a request for on-demand provisioning of a server is received from cluster C1, administrator system 150 identifies a FSP based on the required software set S1, S2, S3 corresponding to cluster C1 (determined based on table 450) and the setup data of table 400.

In one embodiment, administrator system 150 determines the difference between the required software set and the pre-installed software sets corresponding to the free server pools (column 413). Administrator system 150 then determines the ascending order of differences as being FSP4, FSP3, FSP1, and FSP5. It may be noted that FSP2 is not included in the order since servers of FSP2 requires un-installation of softwares S4 and S5, which may not be desirable.

Administrator system 150 then identifies the first group FSP3 having an available server (since FSP4 is indicated to contain no available servers). Administrator system 150 then selects a server (190Y) from the identified free server pool FSP3 and installs the difference S1 between the required software set S1, S2, S3 and the pre-installed software set S2, S3.

Administrator system 150 then sends a response to the request from cluster C1 indicating that the selected server 190Y is provisioned, thereby enabling server 190Y to be added to cluster C1 for servicing user/client requests. The addition of the server to the cluster may be performed by (configuration of) the management software executing as part of cluster C1. Administrator system 150 may also update tables 400 and 450, in particular, adding the identifier "190Y" to the server list in column 462 of row 471 (corresponding to cluster C1) and removing the identifier from the server list in column 412 of row 423 (corresponding to FSP3).

In another embodiment, each cluster is associated with a corresponding software module, which is executed when a server is sought to be provisioned and added to the corresponding cluster. The software module corresponding to cluster C1 may be implemented as follows (shown in the form of pseudo code):

```
required_set = [ S1, S2, S3];
fsp_list = [ FSP4, FSP3, FSP5];
foreach( fsp in fsp_list) {
    if (fsp.existsfreeserver( )) {
        server = fsp.getfreeserver( );
        foreach(software in required_set) {
```

```
        if(! server.isInstalled(software)) {
            server.install(software);
        }
    }
    cluster.add(server);
    break;
        }
    }
```

The variable "required_set" indicates the set of softwares S1, S2, S3 that is required to be installed corresponding to cluster C1, and the variable "fsp_list" indicates an order FSP4, FSP3, FSP5, in which free server pools are to be checked for identification of a group (manually specified by the developer/administrator).

The outer "foreach" loop is executed for each of the free server pools (variable "fsp") in the fsp_list. The "existsfreeserver" function checks whether the free server pool "fsp" has at least one available server, while the "getfreeserver" function selects an available server (variable "server") in the free server pool "fsp" if the function "existsfreeserver" indicates that there are available servers in "fsp".

The inner "foreach" loop is executed for each of the softwares in the required_set, with the inner "if" condition ensuring that each of the softwares in the required_set is installed on the server only when the software is not already installed (that is, not contained in the pre-installed set). The "cluster.add" function adds the provisioned server "server" to cluster C1 and also may update the setup/cluster data (remove "server" from table 400 and add "server" to table 450) as described above.

While only a single server is described as being requested and added to a cluster, it should be appreciated that multiple servers can be requested and added by extending the approaches above, as will be apparent to one skilled in the relevant arts by reading the disclosure provided herein.

It should be appreciated that the above-described features of administrator system 150 may be implemented in a combination of one or more of hardware, software, and firmware (though embodiments are described as being implemented in the form of software instructions). The description is continued with respect to an embodiment in which various features are operative by execution of corresponding software instructions.

7. Digital Processing System

Figure 5:
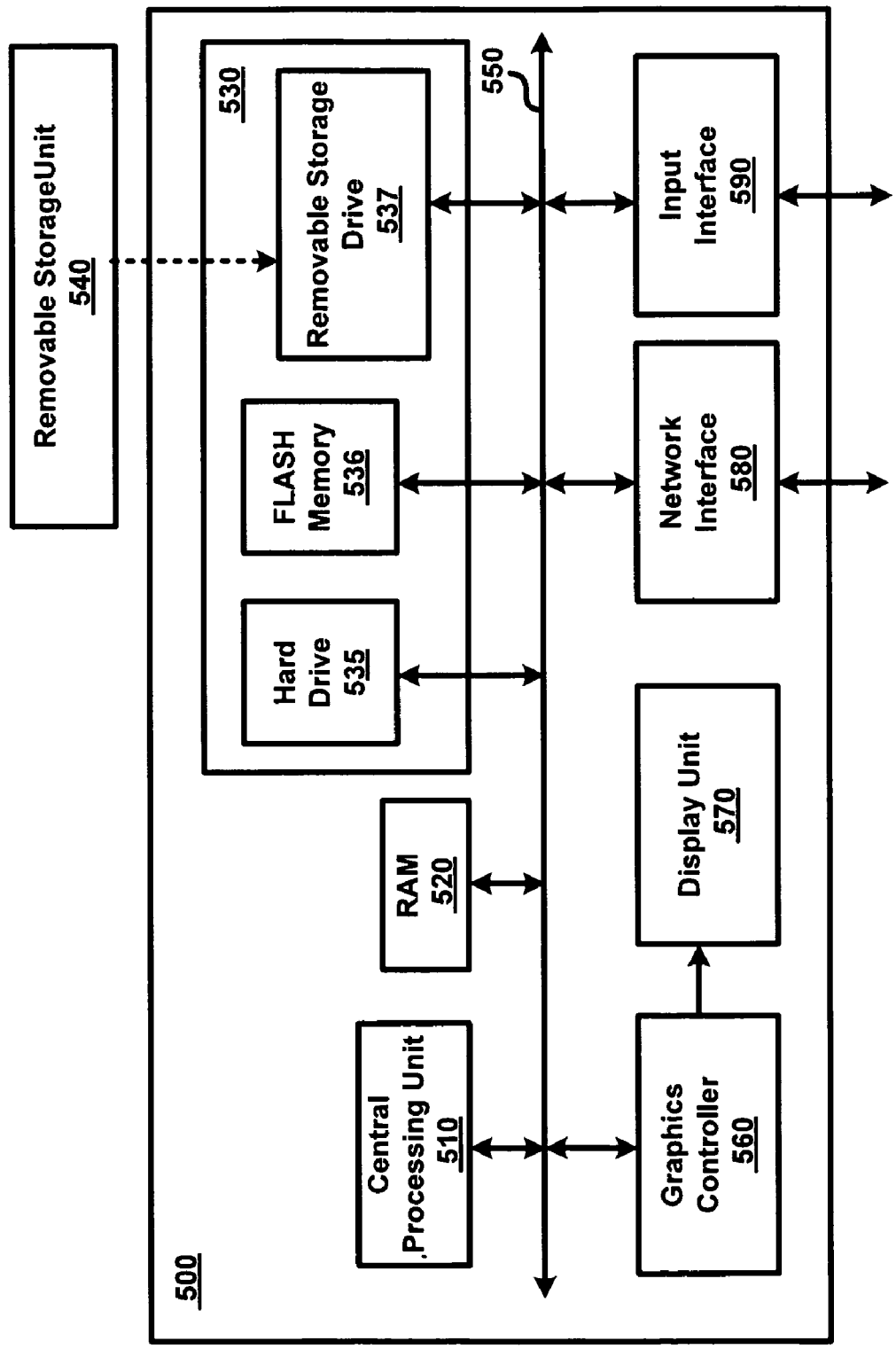
FIG. 5 is a block diagram illustrating the details of a digital processing system in which several aspects of the present invention are operative by execution of appropriate software instructions.

FIG. 5 is a block diagram illustrating the details of digital processing system 500 in which various aspects of the present invention are operative by execution of appropriate software instructions. Digital processing system 500 may correspond to administrator system 150. Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention described above. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images (e.g., portions of screens depicted in FIGS. 4, 6A and 7) defined by the display signals.

Input interface 590 may correspond to a keyboard and a pointing device (e.g., touch-pad, mouse) and may be used to provide inputs (e.g., by the administrator when configuring the setup data). Network interface 580 provides connectivity to a network (e.g., using Internet Protocol), and may be used to communicate with other connected systems (client systems 110A-110C, data stored 180, server systems 190A-190Z) of FIG. 1.

Secondary memory 530 may contain hard drive 535, flash memory 536, and removable storage drive 537. Secondary memory 530 may store the data (e.g., portions of data depicted in FIGS. 4A and 4B) and software instructions, which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
a plurality of clusters, each containing a corresponding plurality of servers, all the servers in a same cluster requiring installation of and being installed with a corresponding set of required softwares;
a plurality of free server pools, each containing a corresponding plurality of servers, all the servers in a same free server pool being pre-installed with a corresponding set of pre-installed softwares; and
an administrator system operable to:
   maintain a setup data indicating the respective pre-installed software sets installed on the corresponding ones of said plurality of free server pools;
   receive a request to add a server to a first cluster contained in said plurality of clusters, wherein the servers provisioned with the corresponding set of pre-installed software are grouped into corresponding free server pools before said request is received;
   compute a respective difference of the set of required softwares for said first cluster and the pre-installed software sets installed on the corresponding ones of said plurality of free server pools based on said setup data;
   determine a first free server pool of said plurality of free server pools based on the computed differences;
   select a first server in said determined first free server pool and to install a difference of the corresponding required set of softwares of the first cluster and the corresponding pre-installed set of software of the first free server pool, wherein said first free server pool is determined first and then said first server is selected from said first free server pool;
   add said first server, with the corresponding set of required softwares installed, to said first cluster in response to receiving said request,
   wherein at least some of the servers in said plurality of clusters and server pools and said administrator system contain a corresponding processor and a corresponding memory.

2. The computing system of claim 1, wherein said administrator system maintains a cluster data,
said cluster data indicating said plurality of clusters and the corresponding set of required software for each cluster,
wherein said administrator system computes said respective difference based on said setup data and said cluster data.

3. The computing system of claim 2, wherein said administrator system is designed to receive a second request to add a second server to a second free server pool contained in said plurality of server pools,
said administrator system to determine a second set of pre-installed softwares corresponding to said second free server pool based on said setup data,
said administrator system to install said second set of pre-installed softwares on said second server.

4. The computing system of claim 2, wherein said administrator system is designed to determine a corresponding difference between the required set of softwares of the first cluster and the corresponding set of pre-installed software for each of said free server pool,
wherein said administrator system decides the free server pool having minimal difference of said corresponding differences and having an available server as said first free server pool.

5. The computing system of claim 2, wherein said plurality of clusters and said plurality of free servers pools are contained in a cloud or grid computing environment.

6. A method of on-demand provisioning in a computing system containing a plurality of clusters, each cluster containing a corresponding plurality of servers, all the servers in a same cluster requiring installation of and being installed with a corresponding set of required softwares, said computing system further containing available servers organized in the form of a plurality of free server pools, each free server pool containing a corresponding plurality of servers, all the servers in a same free server pool being pre-installed with a corresponding set of pre-installed softwares, said method comprising:
maintaining a setup data indicating the respective pre-installed software sets installed on the corresponding ones of a plurality of free server pools;
receiving a request to add a server to a first cluster contained in said plurality of clusters;
computing a respective difference of the set of required softwares for said first cluster and the pre-installed software sets installed on the corresponding ones of said plurality of free server pools based on said setup data;
determining a first free server pool of said plurality of free server pools based on the computed differences, said first free server pool containing a first plurality of servers as the corresponding plurality of servers;
identifying, after said determining, a first server of said first plurality of servers in said first free server pool;
installing, on said first server but not all of said first plurality of servers, softwares representing the computed difference between the set of required softwares and the pre-installed set of softwares of said first free server pool; and
adding said first server to said first cluster in response to receiving said request.

7. The method of claim 6, wherein said identifying and determining together first identifies one of said free server pools having at least one available server and then said first server as one of the available servers in the identified free server pool.

8. The method of claim 6, wherein said determining comprises:
maintaining a cluster data, wherein said cluster data indicates said plurality of clusters and the corresponding set of required software for each cluster;
and
deciding a free server pool having minimal value of said corresponding differences and having an available server as said first free server pool.

9. The method of claim 6, wherein said adding comprises:
executing the required set of software, including the installed software, on said first server;
updating said setup data to indicate that said first server is not available for any further requests; and
sending a response indicating said first server is added to said first cluster.

10. The method of claim 6, if said installing on said first server fails, further comprising:

identifying another server having another set of pre-installed softwares, and performing said determining, installing and adding with respect to said another server to add said another server to said first cluster.

11. The method of claim 8, further comprising:

receiving a second request to add a second server to a second free server pool contained in said plurality of server pools;

determining a second set of pre-installed softwares corresponding to said second free server pool based on said setup data; and installing said second set of pre-installed softwares on said second server.

12. A non-transitory computer readable medium storing one or more sequences of instructions for causing an administrator system to perform on-demand provisioning in a computing system containing a plurality of clusters, each cluster containing a corresponding plurality of servers, all the servers in a same cluster requiring installation of and being installed with a corresponding set of required software, said computing system further containing available servers organized in the form of a plurality of free server pools, all the servers in a same free server pool being pre-installed with a corresponding set of pre-installed softwares, wherein execution of said one or more sequences of instructions by one or more processors contained in said network monitoring system causes said installer system to perform the actions of:

maintaining a setup data indicating the respective pre-installed software sets installed on the corresponding ones of a plurality of free server pools;

receiving a request to add a server to a first cluster contained in said plurality of clusters, wherein the servers provisioned with the corresponding set of pre-installed software are grouped into corresponding free server pools before said request is received;

computing a respective difference of the set of required softwares for said first cluster and the pre-installed software sets installed on the corresponding ones of said plurality of free server pools based on said setup data;

determining a first free server pool of said plurality of free server pools based on the computed differences;

identifying a first server in said first free server pool;

determining a difference of the corresponding required set of softwares of the first cluster and said pre-installed set of software of the first free server pool;

installing softwares representing said difference on said first server; and adding said first server to said first cluster in response to receiving said request.

13. The non-transitory computer readable medium of claim 12, wherein said identifying and determining together first identifies one of said free server pools having at least one available server and then said first server as one of the available servers in the identified free server pool.

14. The non-transitory computer readable medium of claim 13, wherein said determining comprises:

maintaining a cluster data, wherein said cluster data indicates said plurality of clusters and the corresponding set of required software for each cluster; and deciding a free server pool having minimal value of said corresponding differences and having an available server as said first free server pool.

15. The non-transitory computer readable medium of claim 12, wherein said adding comprises:

executing the required set of software, including the installed software, on said first server;

updating said setup data to indicate that said first server is not available for any further requests; and sending a response indicating said first server is added to said first cluster.

16. The non-transitory computer readable medium of claim 12, if said installing on said first server fails, further comprising:

identifying another server having another set of pre-installed softwares, and performing said determining, installing and adding with respect to said another server to add said another server to said first cluster.

17. The non-transitory computer readable medium of claim 14, further comprising:

receiving a second request to add a second server to a second free server pool contained in said plurality of server pools;

determining a second set of pre-installed softwares corresponding to said second free server pool based on said setup data; and installing said second set of pre-installed softwares on said second server.

18. The method of claim 6, wherein said request is for adding only a single server to said first cluster, and wherein said installing installs only on said first sever, but not on any other ones of said first plurality of servers, in response to said request.

* * * * *

UNITED STATES PATENT AND TRADEMARK OFFICE
CERTIFICATE OF CORRECTION

| | | |
|---|---|---|
| PATENT NO. | : 8,185,624 B2 | Page 1 of 1 |
| APPLICATION NO. | : 12/399993 | |
| DATED | : May 22, 2012 | |
| INVENTOR(S) | : Pal et al. | |

It is certified that error appears in the above-identified patent and that said Letters Patent is hereby corrected as shown below:

On Title page 2, Item (56), under "Other Publications", line 8, delete "INc" and insert -- Inc --, therefor.

In column 11, line 21, in Claim 1, delete "pre -installed" and insert -- pre-installed --, therefor.

Signed and Sealed this
Twenty-eighth Day of August, 2012

David J. Kappos
*Director of the United States Patent and Trademark Office*